(12) United States Patent
Andreica et al.

(10) Patent No.: US 11,574,028 B2
(45) Date of Patent: Feb. 7, 2023

(54) ANNOTATION AND RETRIEVAL OF PERSONAL BOOKMARKS

(71) Applicant: Google LLC, Mountain View, CA (US)

(72) Inventors: Mugurel Ionut Andreica, Adliswil (CH); Jonathan Small, Mountain View, CA (US); Marcin M. Nowak-Przygodzki, Bäch (CH)

(73) Assignee: GOOGLE LLC, Mountain View, CA (US)

( * ) Notice: Subject to any disclaimer, the term of this patent is extended or adjusted under 35 U.S.C. 154(b) by 35 days.

(21) Appl. No.: 16/972,250

(22) PCT Filed: Apr. 16, 2019

(86) PCT No.: PCT/US2019/027660
§ 371 (c)(1),
(2) Date: Dec. 4, 2020

(87) PCT Pub. No.: WO2020/005369
PCT Pub. Date: Jan. 2, 2020

(65) Prior Publication Data
US 2021/0240793 A1 Aug. 5, 2021

Related U.S. Application Data

(60) Provisional application No. 62/691,061, filed on Jun. 28, 2018.

(51) Int. Cl.
G06F 17/00 (2019.01)
G06F 16/955 (2019.01)
(Continued)

(52) U.S. Cl.
CPC ...... *G06F 16/9562* (2019.01); *G06F 16/9574* (2019.01); *G06F 16/972* (2019.01); *G06F 40/169* (2020.01)

(58) Field of Classification Search
None
See application file for complete search history.

(56) References Cited

U.S. PATENT DOCUMENTS 7,493,293 B2 2/2009 Kanungo et al.
7,730,085 B2 6/2010 Hassan et al.
(Continued)

OTHER PUBLICATIONS

European Patent Office; International Search Report and Written Opinion of Ser. No. PCT/US2019/027660; 21 pages; dated Jun. 28, 2019.

(Continued)

*Primary Examiner* — Mustafa A Amin
(74) *Attorney, Agent, or Firm* — Gray Ice Higdon

(57) ABSTRACT

Methods, systems, and apparatus, including computer programs encoded on a computer storage medium, for receiving a first input associated with a bookmark and, in response to receiving the first input, obtaining context data for deriving annotations for the bookmark. An annotation engine of a system obtains multiple annotations that are derived using information included in the context data and a transcription of the first input associated with the bookmark. The annotation engine generates an importance value for each annotation. The importance value characterizes a relationship between each annotation and at least one of: the information included in the context data; or the transcription of the first input. The annotation engine generates a set of annotations for retrieving the bookmark. Each annotation in the set of annotations is generated from the obtained multiple annotations and each annotation has an importance value that exceeds a threshold value.

20 Claims, 7 Drawing Sheets

(51) Int. Cl.
  *G06F 16/957* (2019.01)
  *G06F 16/958* (2019.01)
  *G06F 40/169* (2020.01)

(56) References Cited

U.S. PATENT DOCUMENTS

| | | | |
|---|---|---|---|
| 2005/0114756 A1 | 5/2005 | Lehikoinen et al. | |
| 2007/0271498 A1* | 11/2007 | Schachter | G06F 16/9562 715/764 |
| 2008/0027914 A1* | 1/2008 | Caputo | H04L 65/1069 |
| 2008/0086496 A1* | 4/2008 | Kumar | G06F 16/958 707/999.102 |
| 2009/0144240 A1* | 6/2009 | Singh | G06F 16/951 |
| 2010/0169756 A1 | 7/2010 | Bonchi et al. | |
| 2011/0137919 A1 | 6/2011 | Ryu et al. | |
| 2013/0346873 A1* | 12/2013 | Vasudev | H04L 67/02 715/738 |
| 2015/0185985 A1* | 7/2015 | Kang | H04M 1/72445 715/728 |
| 2015/0324598 A1* | 11/2015 | Shams | G06F 16/22 707/781 |
| 2015/0379128 A1* | 12/2015 | Chang | G06F 16/951 707/711 |
| 2016/0350136 A1 | 12/2016 | Karlo et al. | |
| 2018/0090135 A1 | 3/2018 | Schlesinger et al. | |
| 2019/0362403 A1* | 11/2019 | Chow | G06Q 30/0625 |
| 2022/0035886 A1* | 2/2022 | Waterton | G06F 16/9535 |

OTHER PUBLICATIONS

Dunietz, J. et al., "A New Entity Salience Task with Millions of Training Examples;" Proceedings of the 14th Conference of the European Chapter of the Association for Computational Linguistics; pp. 205-209; Apr. 26, 2014.

IBM Knowledge Center; "Named Entity Recognition Annotator;" retrieved from internet, https://www.ibm.com/support/knowledgecenter/SS8NLW_10.0.0/com.ibm.discovery.es.ta.doc/iiystasystemt.htm on Dec. 2, 2020; 2 pages.

Stanford NLP Group; CoreNLP, "Full List Of Annotators;" retrieved from internet, https://stanfordnlp.github.io/CoreNLP/annotators.html on Dec. 2, 2020; 8 pages.

European Patent Office; Communication pursuant to Article 94(3) issued in Application No. 19720332.6, 8 pages, dated Jun. 30, 2022.

* cited by examiner

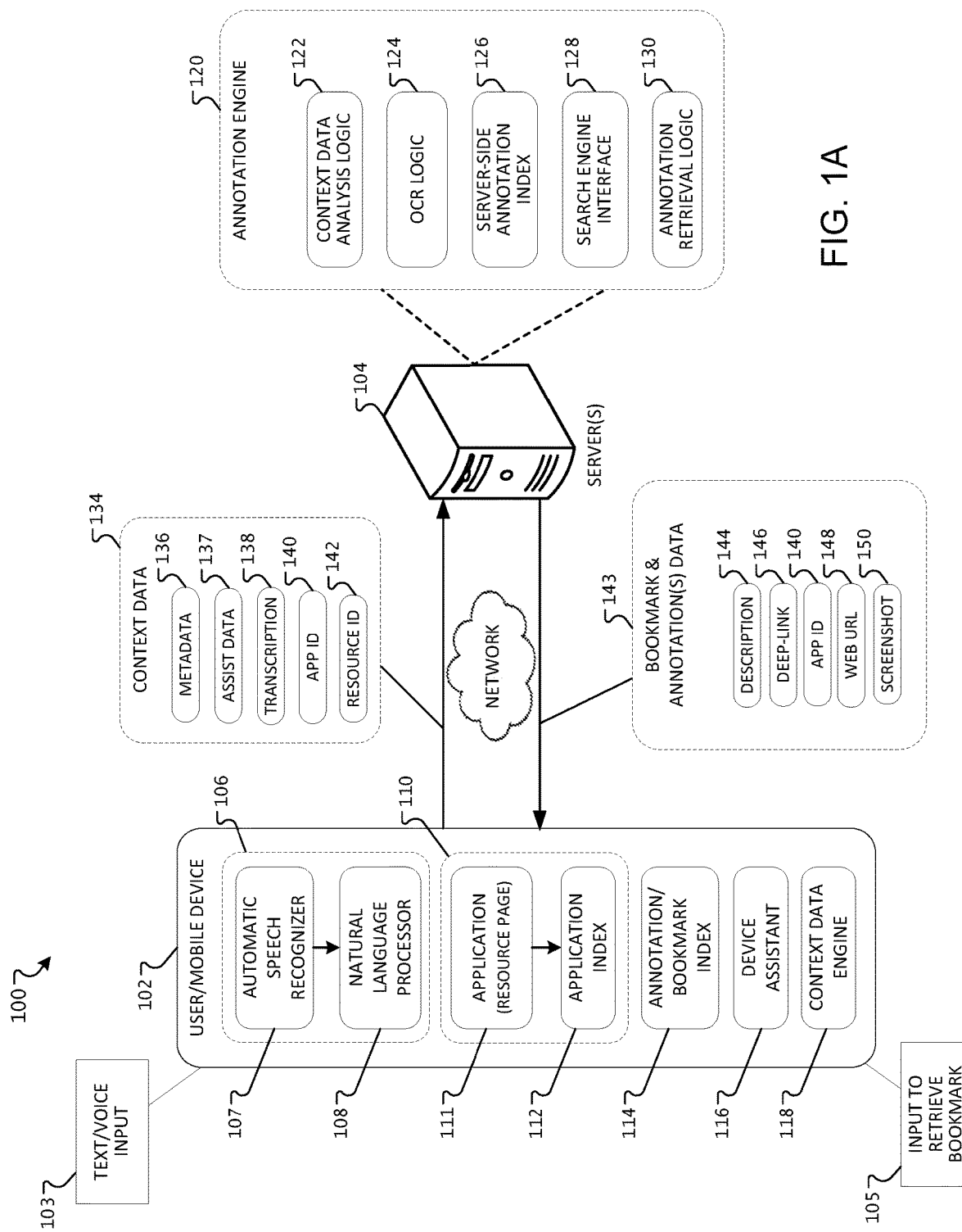

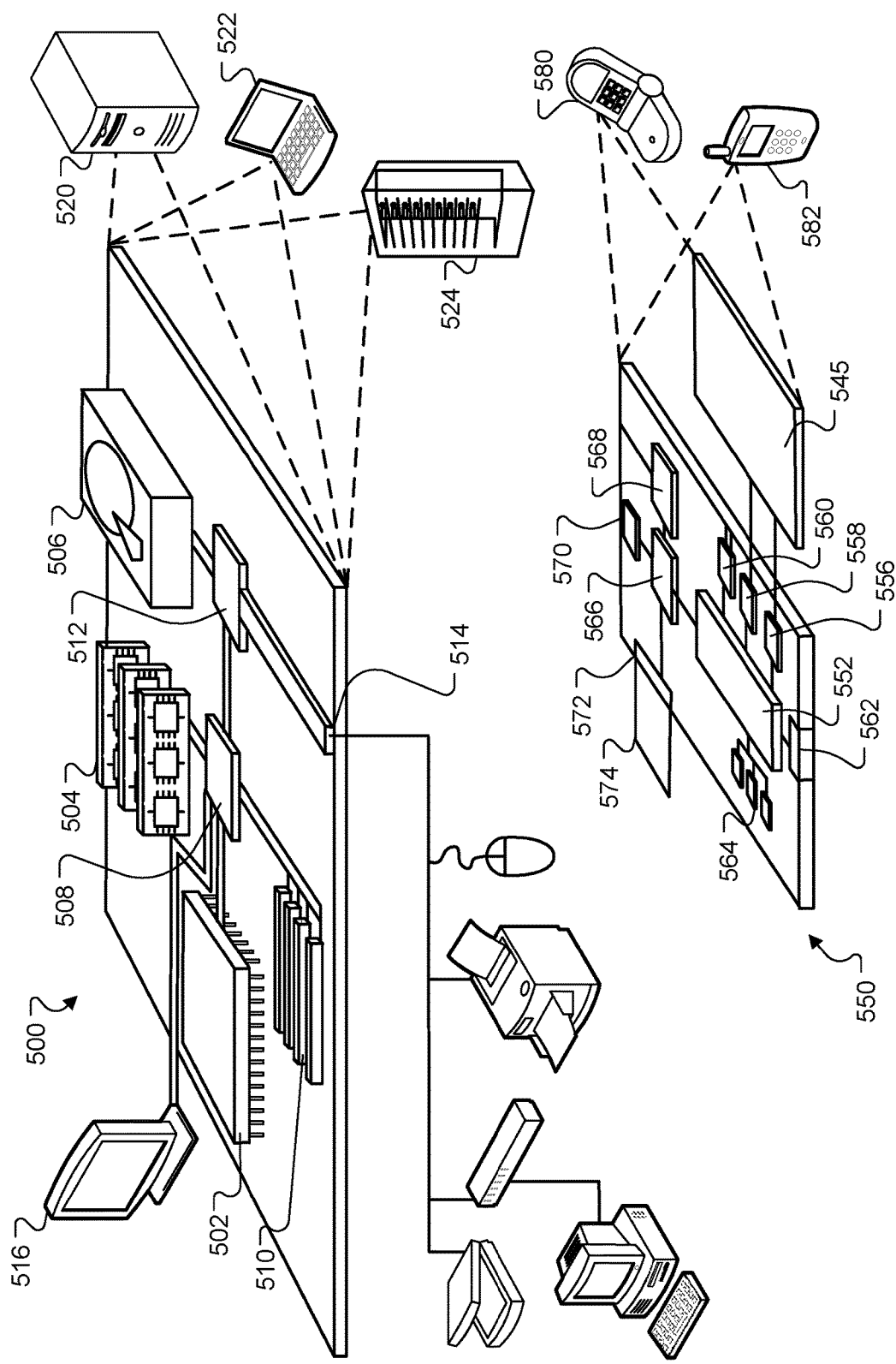

ANNOTATION AND RETRIEVAL OF PERSONAL BOOKMARKS

FIELD

The present specification is related to mobile devices.

BACKGROUND

Websites and application resources can include any number of links, embedded files, and/or other information that may or may not be relevant to a user. In particular, users may detect sources of information or other resources that are directly relevant to an interest of the user. As such, users may desire expedited access to particularly relevant web-based or application resources. The user may create a bookmark that stores an electronic link to relevant web-based or application content. The user can later access the bookmark to quickly navigate to the relevant content. In the context of computing systems, bookmarks can be created and stored either locally, or remotely, for subsequent access via an example electronic device.

SUMMARY

This document describes techniques for adding an annotation(s) to user-created personal bookmarks. The annotations can be added automatically using information relating to an initial user input received at a client device or manually by the user. A bookmark can be considered a pair of information items (e.g., a name and a web address/URL). The name is an identifier of the bookmark and the URL is a web address, such as www.example.com, of a resource page which the user can access using the web address. Multiple annotations can be associated with the bookmark. Each of the multiple annotations can be either manually provided by the user or inferred automatically using an annotation engine of a computing system.

This document also describes techniques for retrieving the bookmarks based on a determination that a respective annotation for the bookmark matches content of a subsequent user input received at the client device. For example, a user can retrieve a bookmark in response to the computing system determining that content of the subsequent user input (e.g., a query or command) matches terms or other information items included in data about the bookmark. The system uses specific computing rules to determine whether a user command matches data about the bookmark. This determination and matching can be performed by specific computing logic for determining a match between the user command and an annotation for the bookmark.

One aspect of the subject matter described in this specification can be embodied in a computer-implemented method. The method includes, receiving, by a computing system, a first input associated with a bookmark; in response to receiving the first input, obtaining, by the computing system, context data for deriving annotations for the bookmark; obtaining, by an annotation engine of the computing system, multiple annotations that are derived using information included in the context data and a transcription of the first input associated with the bookmark. The method includes, generating, by the annotation engine, an importance value for each annotation, the importance value characterizing a relationship between each annotation and at least one of: i) the information included in the context data; or ii) the transcription of the first input; generating, by the annotation engine, a set of annotations for retrieving the bookmark, each annotation in the set of annotations being generated from the obtained multiple annotations and each annotation having an importance value that exceeds a threshold value; and using, by the computing system, a particular annotation in the set of annotations to retrieve the bookmark for accessing a resource page.

These and other implementations can each optionally include one or more of the following features. For example, in some implementations, using the particular annotation includes: receiving, by the computing system, a second input; and selecting, by the annotation engine and based on the second input, the particular annotation from the set of annotations to cause retrieval of the bookmark; and using, by the computing system, the particular annotation to retrieve the bookmark for accessing the resource page.

In some implementations, selecting includes: analyzing a transcription of the second input; obtaining one or more terms from the transcription of the second input; for each annotation in the set of annotations: determining a similarity score that indicates an extent to which terms in the transcription of the second input matches terms in the annotation for retrieving the bookmark; and selecting the particular annotation based on the similarity score for the annotation exceeding a threshold similarity score.

In some implementations, the particular annotation is configured as a trigger to cause retrieval of the bookmark and the method further includes: determining, by the computing system, that a trigger condition is satisfied based on analysis of a transcription of a second input; retrieving, by the computing system, the bookmark from a bookmark index in response to determining that the trigger condition is satisfied; and providing, by the computing system, the bookmark for display at a client device in response to retrieving the bookmark from the bookmark index.

In some implementations, the context data for deriving the annotations is obtained from a plurality of data sources, each data source of the plurality of data sources comprising at least one of: i) an identifier for the bookmark; ii) a resource identifier stored as the bookmark; iii) a resource page that is accessed using the resource identifier; iv) text of the resource page; or v) information obtained from a search engine based on search queries that reference the resource identifier.

In some implementations, the context data for deriving the annotations includes an N-gram and data describing an entity, each of the N-gram and the data describing the entity being obtained from a plurality of data sources with reference to the transcription of the first input. In some implementations, i) the resource page is generated by a web-browser application, and ii) the resource identifier is a uniform resource locator (URL) that provides a resource address for accessing the resource page.

In some implementations, i) the resource page is generated by an application accessed using a client device, the application being configured to store one or more deep-links in an application index, and ii) the resource identifier is a uniform resource locator (URL) for the resource page and is obtained from the application index comprising address data about the application.

In some implementations, the resource identifier is at least one of: a) data identifying a screen image of the resource page generated by an application accessed using a client device, or b) a deep-link that provides a resource address for accessing the resource page of the application.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments and can result in one or more of the following advantages. Techniques are described that enable enhanced annotation and retrieval of stored bookmarks relative to other systems. For example, annotations may be used to improve the functionality and accessibility of the bookmarks, thereby improving a user-device interface to facilitate better user control of device operations. The described techniques enable bookmarks to be annotated and retrieved in an expedited and computationally efficient manner based on voice or other input from a user and a computing context of a client device that receives and processes the user input. For example, rather than a computing device receiving and processing multiple touch or physical inputs from a user, a single input (e.g., voice or text input) can be used by a system to both create the bookmark as well as generate one or more respective annotations for the bookmark.

By using a single user input to perform multiple processor functions relating to a bookmark, the system can quickly and efficiently obtain data for creating the bookmark, generate the annotation for the bookmark, and store data associated with the annotation as well as the bookmark. For example, the system executes specific computing rules that are configured to analyze data describing a computing context for an input session at a client device. The computing system can utilize pre-existing entity data and other information items of the computing context to efficiently obtain resource identifiers, e.g., URLs/deep-links, for creating the bookmark. For example, the system can use machine learning logic to iteratively analyze data from multiple sources of information that relate to the computing session. This iterative analysis enables the system to better identify terms that have increased importance when generating annotations for the bookmark.

The described techniques causes the system to automatically refine its computing processes for analyzing terms and other context data, thereby enabling the annotations and retrieval operations of the system to be performed with increased efficiency and accuracy over time. A repeatable automated annotation process is described that involves minimal human intervention and does not require manual execution of annotator functions. For example, the described techniques enable automation of analyzing information items from multiple data sources that are invoked for a given computing context. In some implementations, a single voice input can be used as a trigger for the analysis. Hence, the techniques enable computing systems to quickly perform operations that the systems were previously unable to automatically perform in an efficient manner due to challenges of obtaining bookmark annotations and respective importance value for each annotation based on a single voice input from a user.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A and 1B are example computing systems for annotating and retrieving bookmarks.

FIG. 5 is a block diagram of a computing system that can be used in connection with computer-implemented methods described in this specification.

Like reference numbers and designations in the various drawings indicate like elements.

DETAILED DESCRIPTION

Figure 1B:
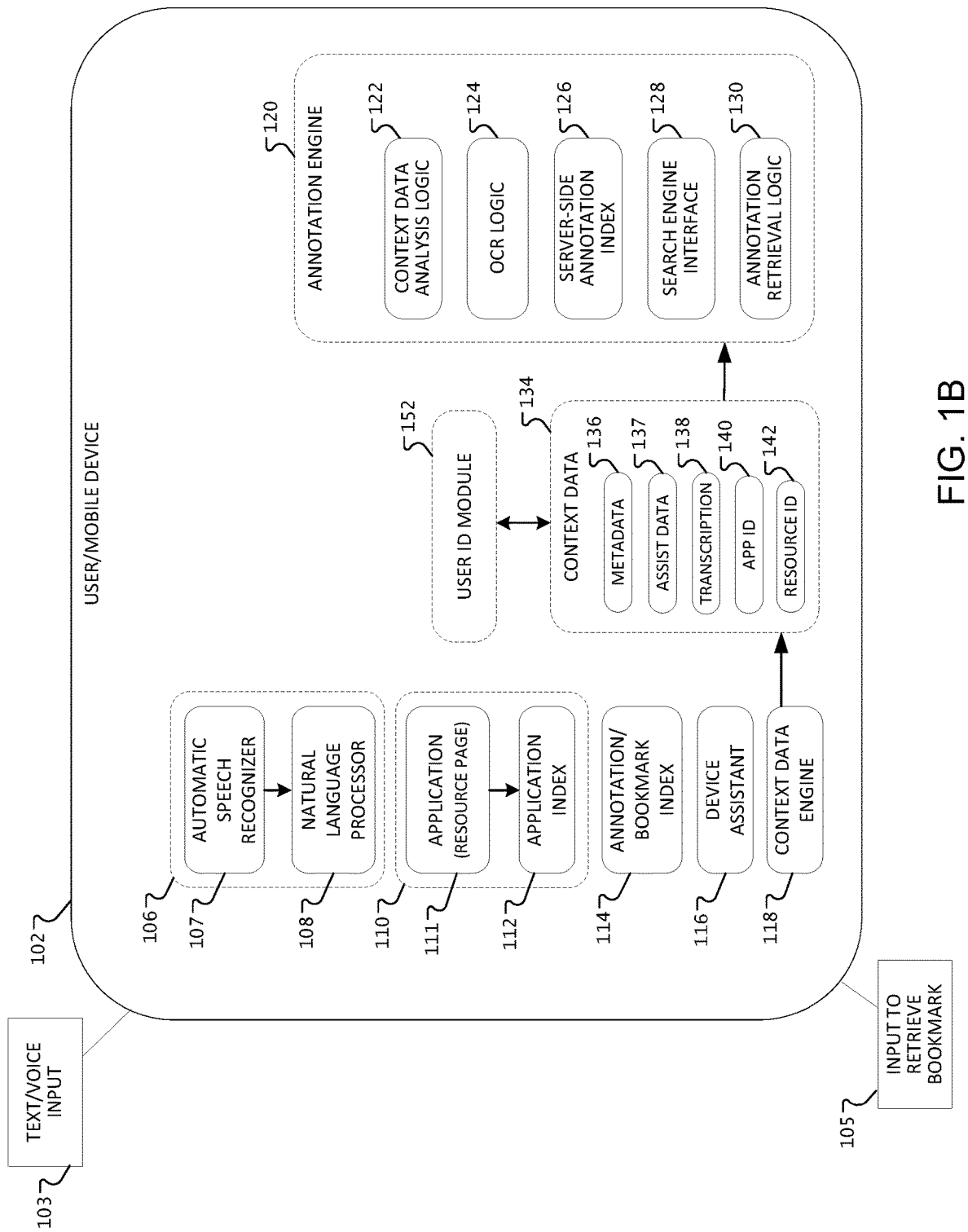

FIG. 1A is an example computing system 100 for annotating and retrieving bookmarks. System 100 annotates bookmarks based on a first or initial input, e.g., voice, text, or other types of input, from a user and retrieves an annotation for accessing the bookmark based on a second or subsequent input from the user. A mobile or client device of system 100 receives voice input and generates an electronic bookmark. The bookmark is for accessing a resource page using a web-based Uniform Resource Identifier (URI), such as a Uniform Resource Locator (URL), or for accessing a resource page generated by a native application (also known as an "app") of a client device. The client device accesses the resource page of the native application by referencing an application index that includes multiple deep-links and using a deep-link that maps to the resource page.

A client device receives voice/text input from a user that indicates a desired bookmark function. The client device may receive the voice input while the user is browsing a website or web-based resource, or while the user is navigating a resource page of a native application. In this context, techniques are described for adding an annotation(s) to user-created personal bookmarks. The annotations can be added automatically using information relating to an initial user input received at a client device or manually by the user. Multiple annotations can be associated with a bookmark. Each of the multiple annotations can be either manually provided by the user or inferred automatically using an annotation engine of a computing system. Techniques are also described for retrieving the bookmarks based on a determination that an annotation for the bookmark matches content of a subsequent user input received at a client device.

System 100 includes user/client device 102 and at least one computing server 104 (described below). Client device 102 can be any suitable electronic user device configured to receive voice inputs, or other inputs, from a user. In general, references to voice input or voice input 103 (or 105) are merely examples of inputs that can be received at client device 102 or system 100, and a variety of other types of inputs, such as text inputs, numerical inputs, touch inputs, or other related input data structures are also within the scope of this document.

In some implementations, client device 102 is a cellular smart phone device, a laptop computer, a desktop computer, a tablet computer, an electronic reader device, a smart television, or any other mobile computing device configured to receive voice input. In some embodiments, client device 102 is a "smart speaker," such as a Google Home or other related smart speaker devices. In general, the client device 102 includes assistant functionality, permitting functions such as conversational query, question and answer, Internet of Things (IoT) control functions, or other related functions.

Client device 102 includes speech module 106. Speech module 106 includes an automatic speech recognizer 107 ("ASR 107") and a natural language processor 108 ("NLP 108"). In some implementations, client device 102 receives voice input 103 indicating that a user wants to generate a new bookmark. The bookmark can be used to expedite or streamline subsequent access to a web-resource presented to the user on an example display of client device 102. Speech module 106 can be used to analyze data about the received voice input, e.g., audio signal data, and to generate a transcription of the voice input.

ASR 107 can be example speech recognition logic, programmed instructions, or algorithms that are executed by one or more processors of client device 102 (or computing server 104 described below). For example, ASR 107 can execute program code to manage identification, extraction, and analysis of audio characteristics of received voice input 103. Further, ASR 107 can execute comparator logic to compare audio characteristics of the received voice input 103 to various model parameters stored in connection with NLP 108. Results of the comparison yields text transcription outputs that correspond substantially to voice/speech utterances of voice input 103.

NLP 108 can be an example language processor used in speech recognition to specify or identify certain word combinations or sequences. In some implementations, NLP 108 is configured to generate a word sequence probability factor that is used to indicate the likely occurrence or existence of particular word sequences or word combinations. In some instances, the identified word sequences correspond primarily to sequences that are specific to speech corpus rather than to, e.g., written corpus.

Client device 102 also includes application module 110. Application module 110 can be used at least to: i) execute a particular application 111 for generating a resource page of the application; or ii) access an application index 112 that stores data associated with a particular application 111. In some implementations, application 111 is a web-browser or a native application stored on client device 102 and application index 112 includes address data about resource pages of the native application. In some instances, data stored via application index 112 includes a deep-link to a resource page generated by application 111. Native applications can be configured to store one or more deep-links in application index 112, and each deep-link can map to a resource page generated by the native application. Each deep-link also provides a resource address for accessing a resource page that is mapped to the deep-link.

Client device 102 further includes an annotation index 114, device assistant 116, and context data engine 118. Index 114 provides local storage of, and access to, annotation data for generated bookmarks. For example, index 114 can be configured to store a listing of multiple annotations that are generated at least based on voice input 103. As described in more detail below, data for the annotations can be stored either locally at client device 102 and/or at an example cloud-based storage device using computing server 104. Device assistant 116 can correspond to a software program configured to provide one or more virtual assistant functions to the user. For example, device assistant 116 is configured to detect or receive a voice query from a user (often after detecting a hotword or similar word or phrase used to initiate a listening mode for the user/mobile device 102), execute computations to obtain web results that are responsive to the query, and provide an auditory response based on the obtained web or search results. As discussed in more detail below, in some implementations, annotations are created using search results from search queries generated using device assistant 116 and that are responsive to a user voice query received by client device 102.

Context data engine 118 is configured to extract or obtain context data 134 about a web-based resource or native application, e.g., application 111, being executed by client device 102 when voice input 103 is received by the device. For example, context data engine 118 is configured to extract one or more of: i) a URL/URI that identifies a resource (e.g., page) of a native application, ii) an identifier for the native application, iii) a website URL that identifies a resource page of the website, or iv) a screenshot of a resource page presented to the user on a display of client device 102 when voice input 103 is received at the device. In general, a URL is a type of URI. In some cases, a URI is an identifier that is used for implementations involving on-device content.

In some implementations, device assistant 116 can generate data associated with a displayed resource page, e.g., device assist data 137. This device assist data 137 can include multiple data elements that indicate attributes of the displayed resource page. For example, device assist data 137 can include a username of a sender or recipient of an electronic message displayed by an example messaging application or data about information displayed via a particular resource page. As described herein, information of context data 134 is used to generate annotations for a bookmark. For example, information from a variety of data sources that are invoked during a given computing context can be used to generate annotations for a bookmark. In some implementations, information such as entities, names, contacts, user names, addresses, or phone numbers can be used to generate annotations for a bookmark, so that data for accessing a bookmark can be extracted and analyzed based on the annotation.

Context data 134 can include metadata 136, device assist data 137, a transcription 138, an application identifier 140 ("app ID 140"), and a resource identifier (ID) 142. Context data 134 can indicate contextual information about a particular resource page generated for display to the user or information about a web-based resource or a native application that is accessible via client device 102. For example, contextual information of context data 134 can include at least one of: i) resource identifier 142, e.g., a URL/deep-link, that provides an address for accessing a particular resource page; ii) description data that can be used to identify a bookmark; iii) a screenshot/digital image of a particular resource page; or iv) an app ID 140 that identifies a native application that is executed by client device 102.

Context data 134 can also include data about query voice inputs received by client device 102. Such data can include a transcription 138 that indicates desired bookmark functions received by client device 102. As shown in FIG. 1A, client device 102 can receive voice input 103, 105 from a user and which indicates a desired bookmark function. For example, the client device can receive, from the user, a voice query to: i) generate/create and store a new bookmark that includes a URL, URI, or deep-link for a particular resource (e.g., page), or ii) access a stored bookmark to view a particular resource page using a URL, URI, or deep-link stored in the bookmark. Client device 102 may receive the voice input while the user is browsing a website or web-based resource, or while the user is navigating a resource page of a native application. In response to system 100 receiving a query to generate a bookmark, computing server 104 receives or obtains context data 134 from client device 102. Server 104 uses the received context data 134 to generate and store one or more annotations for the bookmark.

Computing server 104 generally includes an annotations engine 120 that receives context data 134 and generates one or more annotations for a bookmark based on analysis of context data 134. Annotations engine 120 includes data analysis logic 122, Optical Character Recognition (OCR) logic 124, an annotation index 126, a search engine interface 128, and annotation retrieval logic 130. Annotations engine 120 is an example computing module of server 104 (or accessible by server 104) and that is configured to receive and process information from the multiple data sources that form context data 134. The information is processed to generate multiple annotations for a bookmark and data or reference pointers for accessing the annotations are stored at annotation index 126. Computing elements of annotations engine 120 are described in more detail below with reference to FIGS. 2-4.

FIG. 1B is an example embodiment for annotating and retrieving bookmarks, where annotation, storage, and retrieval occurs entirely at client device 102. For the implementation of FIG. 1B, context data 134 is processed and analyzed at client device 102 to generate and store, at client device 102, one or more annotations for a bookmark. For example, one or more information/data items of context data 134 can be analyzed locally at client device 102 to generate, and store, an annotation for a bookmark without accessing or using computing elements of computing server 104. In some instances, client device 102 includes one or more of the computing elements of computing server 104, e.g., an annotation engine 120, such that both annotation and search/retrieval of stored annotations or bookmarks occurs entirely on client device 102.

In some implementations, client device 102 includes a user identification (ID) module 152 that uses data associated with a voice input to recognize a user. For example, user ID module 152 can analyze information items of context data 134 to obtain data associated with voice input 103, such as metadata 136, assist data 137, or transcription 138. Module 152 recognizes the user (an owner of client device 102) based on analysis of the information in context data 134. For example, module 152 can analyze or compare audio signals for the voice input against stored audio signal data for the user. The stored audio signal data can be linked to an identifier or user ID for the user. Module 152 recognizes the user based on a determination that characteristics of the audio signal for the voice input matches, e.g., substantially matches, the stored audio signal data for the user. In response to recognizing the user, module 152 causes context data 134, along with the user ID, to be provided to the annotation engine in order to generate a personalized annotation(s) for the bookmark.

Figure 2:
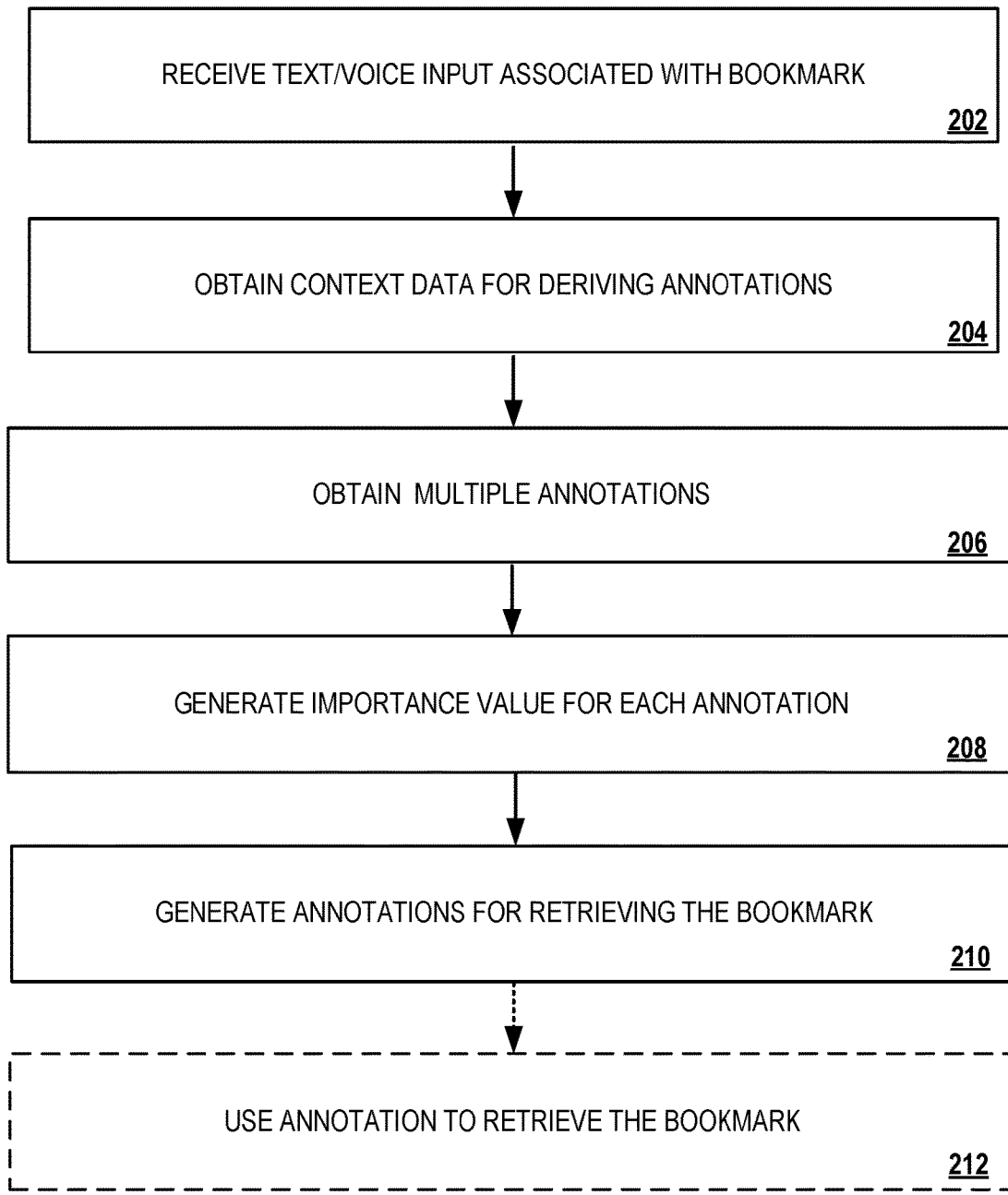
FIG. 2 is a flow diagram of an example process for annotating and retrieving bookmarks based on input from a user.

FIG. 2 is a flow diagram of a process 200 for annotating and retrieving bookmarks based on voice input from a user. Process 200 can be implemented or executed using system 100 described above. Descriptions of process 200 may reference the above-mentioned computing resources of system 100, including client device 102 at the implementation of FIG. 1B. In some implementations, described actions of process 200 are enabled by programmed instructions that are executable by at least one processor and memory of the computing systems described in this document.

Referring now to process 200, system 100 receives a first input associated with a bookmark (202). In response to receiving the voice input, system 100 obtains context data for deriving annotations for the bookmark (204). System 100 generates one or more annotations for a bookmark based on user input received at client device 102, information included in context data 134, or a combination of both. In some implementations, annotations for a bookmark are provided by a user of client device 102 as user-provided annotations. User-provided annotations can be added when a bookmark is created or at any time after the bookmark is created. User-provided annotations may also be deleted or modified at any time. In some implementations, user annotations are processed in order to extract or obtain N-grams, such as concepts and entities included in the user input. The obtained concepts and entities can be stored at system 100 as automatically inferred annotations that have a particularly high importance value (described below).

As discussed above, client device 102 receives voice input 103 from a user. The voice input is related to a bookmark function, such as creating a bookmark or modifying an existing bookmark. Client device 102 may receive voice input 103 while the user is browsing a website or web-based resource, or while the user is navigating a resource page of a native application. In some implementations, a browsing session defines a computing context in which system 100 processes context data 134 from multiple data sources.

Annotation engine 120 obtains multiple annotations based on the processing and analysis of data generated during the computing context (206). The multiple obtained annotations are derived or generated using information included in context data 134, including a transcription 138 of the voice input 103 that is associated with a bookmark. The obtained annotations are automatically inferred from the multiple data sources of context data 134. For example, an annotation is inferred from data sources describing a name of a bookmark, text of a URL for a website or web-based resource page, contents of a URL, e.g., a web page, a screenshot of a webpage, textual content of a screen in an app, or geometry information, e.g., relating to assist data 137. In some implementations, geometry information describes a geometric layout or pattern for application data, such as text and images, which are graphically rendered for output to a user.

For a given computing context, annotations can be inferred from data sources describing metadata associated to the URL or contents of the webpage as well as information linked or associated to the URL by an example search engine. For example, the metadata can indicate or describe entities such as persons, companies, restaurants, or sports teams, as well as a variety of other items of media content that may be included at a webpage. Information linked to a URL by an example search engine can include search queries for which the URL is in a top K search results, where K is a positive integer that can have value ranging from one to at least 100,000. In some implementations, an importance of such queries may depend on a position of the URL in rankings data for the search results. In some cases, the rankings data includes a respective ranking score that defines the URL's rank within the search results. Information linked to a URL by the search engine may further include search queries for which a user has clicked on the URL in the search results. Search queries that include the URL, or that are related to the URL, can have a corresponding importance value. In some implementations, search queries for which a user has clicked on the URL in the search results may be assigned a higher or greater importance value to indicate that such search queries are more important for use in obtaining an annotation for a bookmark.

Annotations can also be inferred from data sources describing other URLs related to a URL of a bookmark and the respective content or items of media content included at a webpage for each of the other URLs. The other URLs may be resource locators that are from the same domain as the URL of the bookmark.

For example, if the URL of the bookmark is www.example.com the other URLs from the same domain can include www.example.com/about-us, which describes information about services offered by an entity such as a bank, or www.example.com/contact-us, which provides contact information for the bank. In some implementations, the other URLs may be resource locators that: i) are classified by a web index as being similar, e.g., substantially similar, to the URL of the bookmark; ii) are a part of the same web-based category (e.g., banking or restaurants) as the URL of the bookmark; or iii) have the same or similar content, entities, and important concepts in common with the URL of the bookmark.

Annotations can also be inferred from data sources that define a name of an app and any information or metadata associated with the app. For example, data for a bookmark can include a pointer or reference pointer for a deep-link used to access a resource page of an app. The data for the bookmark, including the deep-link, can define the name of the app as well as describe metadata tags and other information that associate the bookmark to certain images or text of the resource page displayed when a user interacts with the app.

System 100 extracts one or more annotations based on inferences about context data 134 accessed from the multiple data sources described above. For example, annotations engine 120 can use context data analysis logic 122 to analyze context data 134 and other information from each of the data sources, compute inferences based on the analysis, and extract annotations from the context data 134 based on the computed inferences. In some implementations, annotations engine 120 uses OCR logic 124 to recognize optical characters of context data 134. For example, OCR logic 124 can be used to recognize N-grams or terms of an example transcription received from client device 102 and that corresponds to a voice query received at the device.

From the multiple sources of data and the contextual information described above, or other sources of data related to a computing context, annotations engine 120 extract one or more annotations using content included in the data and contextual information. For example, annotations engine 120 extracts annotations such as important N-grams, synonyms of the important N-grams, important concepts, and important entities. An important N-gram can be formed from single terms or combinations of two or more terms. Important N-grams and concepts can also be derived in multiple ways. For example, important N-grams can be derived using TF-IDF (Term frequency—inverse document frequency) over a corpus of documents or using a machine-learning engine that learns important N-grams based on computed inferences for a training data set.

In some implementations, for at least a subset of important entities, annotations engine 120 extracts annotations such as entities that are related to the important entities extracted from the data sources discussed above. For this subset, annotations engine 120 may also extract annotations such as important N-grams and important concepts related to the above-mentioned important entity, including entity-specific salient terms. Annotations engine 120 assigns a type indicator to each extracted annotation based on the information used to extract the annotation. The type indicator identifies a type of the directly extracted entities and a type of the related entities. For example, if an annotation is extracted using N-grams or terms that are related to restaurants, then annotations engine 120 assigns a "restaurant" type indicator to the annotation. Similarly, if an annotation is extracted using entities or concepts that are related to movies, or a person, then annotations engine 120 may assign a "movie" type indicator, or a "person" to the annotation.

Annotations engine 120 can identify important N-grams, concepts, and entities that are related to an entity, E, based on analysis of search results generated using a search engine. For example, an important N-gram, concept, or other entity can be related to an entity E (e.g., bank of xyz) if entity E and the related content: 1) both appear in the same document; 2) both appear in the set of top K search results for a query processed at the search engine; 3) one appears in a query issued to a search engine and the other appears in the top search results for that query issued to the search engine. In some implementations, annotation engine 120 computes the strength of the relationship between an entity E and an important N-gram, concept, or other entity.

For example, the strength of the relationship can be computed based on how often each of the conditions 1-3 above are true. In some implementations, annotation engine 120 computes strength values based on the conditions and determines a weighting of the strength values based on a significance of the condition. The significance of the condition corresponds to how often the condition is true. For example, if condition 1 is true ten times, while conditions 2 and 3 are only true 5 times, then condition 1 would receive a higher weighting and, thus, would have a higher strength value.

In some implementations, the strength values are computed based on how often each condition is true, weighted by a significance of each condition, plus some combination of TF-IDF logic, so that very popular N-grams, concepts, or entities are not considered strongly related to the entity E. In some cases, system 100 generates term frequency values for data associated with the search results. For example, annotations engine 120 processes terms and other content of the search data by using logic 124 to de-construct the data into a series of N-grams. A weight or biasing value may be assigned to each N-gram based on how frequently the N-gram appears in the data. Such a weight or biasing value can be used to indicate a relative thematic importance of certain N-grams as compared to other N-grams in the series of N-grams. The bias value or weight may be determined by a TF-IDF score.

In some implementations, the weight of the N-grams may be modified based on a number nouns that appear in the N-gram. This is because N-grams with more nouns may indicate a stronger thematic importance. For example, NLP 108 can include a language parser for parsing an N-gram to determine which words are considered nouns. As such, each N-gram weight may be multiplied by the proportion of nouns to total words for each N-gram. Similarly, the weight of the N-grams may be modified base on the number of "stop words" that appear in the N-gram. This is because thematic importance may be reduced as more stop words are used. Accordingly, each N-gram weight may be multiplied by the proportion of non-stop-words to total words for each N-gram. For example, "stop words" may be common words that are likely not relevant to the thematic importance of an N-gram, such as words like "a," "the," and "is."

In some implementations, other methods for extracting entities related to a given entity E include using unstructured text or a knowledge graph. System 100 can be configured to automatically extract and mine relations and related entities from unstructured text. The extracted information can be represented in a graph structure. For example, the extraction of relations and related entities from the data sources described above can be performed by automatically inducting patterns for occurrences of entity information in the data and then applying these induced patterns to unstructured text data. For each relation and entity, multiple features are extracted in order to build a graph, where nodes of the graph data are entities and edges of the graph data are relations.

A knowledge graph is a collection of data representing entities and relationships between entities. The data is logically described as a graph, in which each distinct entity is represented by a respective node and each relationship between a pair of entities is represented by an edge between the nodes. Each edge is associated with a relationship and the existence of the edge represents that the associated relationship exists between the nodes connected by the edge. For example, if a node A represents a person alpha, a node B represents a person beta, and an edge E is associated with the relationship "is the father of," then having the edge E connect the nodes in the direction from node A to node B in the graph represents the fact that alpha is the father of beta.

A knowledge graph can be represented by any of a variety of convenient physical data structures. For example, a knowledge graph can be represented by triples that each represent two entities in order and a relationship from the first to the second entity; for example, [alpha, beta, is the father of], or [alpha, is the father of, beta], are alternative ways of representing the same fact. Each entity and each relationship can be and generally will be included in multiple triples.

Alternatively, each entity can be stored as a node once, as a record or an object, for example, and linked through a linked list data structure to all the relationships the entity has and all the other entities to which the entity is related. More specifically, a knowledge graph can be stored as an adjacency list in which the adjacency information includes relationship information. It is generally advantageous to represent each distinct entity and each distinct relationship with a unique identifier.

The entities represented by a knowledge graph need not be tangible things or specific people. The entities can include particular people, places, things, artistic works, concepts, events, or other types of entities. Thus, a knowledge graph can include data defining relationships between people, e.g., co-stars in a movie; data defining relationships between people and things, e.g., a particular singer recorded a particular song; data defining relationships between places and things, e.g., a particular type of wine comes from a particular geographic location; data defining relationships between people and places, e.g., a particular person was born in a particular city; and other kinds of relationships between entities.

In some implementations, each node has a type based on the kind of entity the node represents; and the types can each have a schema specifying the kinds of data that can be maintained about entities represented by nodes of the type and how the data should be stored. So, for example, a node of a type for representing a person could have a schema defining fields for information such as birth date, birth place, and so on. Such information can be represented by fields in a type-specific data structure, or by triples that look like node-relationship-node triples, e.g., [person identifier, was born on, date], or in any other convenient predefined way. Alternatively, some or all of the information specified by a type schema can be represented by links to nodes in the knowledge graph; for example, [one person identifier, child of, another person identifier], where the other person identifier is a node in the graph.

Annotation engine 120 generates an importance value for each annotation (208). The importance value characterizes a relationship between each annotation and one or more information items in context data 134, including transcription 138 of voice input 103. In some implementations, a user-defined annotation has a greater importance valve relative to an annotation that is automatically inferred. Importance values generated for automatically inferred annotations can vary depending on multiple signals. For example, an importance value that is generated and assigned to an annotation can depend on the source from which the annotation is derived, e.g., identifier of the bookmark, text of the URL for a webpage, content of a URL, metadata for the URL, other related URLs, or queries for which the URL shows up in search results of a search engine, or data included in user contacts stored at client device 102, or other related data sources that can be used to derive an annotation.

An importance value that is generated and assigned to an annotation can also depend on the type of the annotation indicated by the type indicator, as described above. For example, the type indicator for an annotation is determined based on a type of an entity E referenced in the annotation, a related entity, important terms or N-grams in data for the annotation, entity types (e.g., a movie theater, a bank, etc.), related entity types, or combinations of each. An importance value for an annotation can also depend on a determined relevance between the automatically extracted annotation and the data source from which the terms of the annotation were extracted. For example, the data source from which the terms of the annotation were extracted can include metadata 136, assist data 137, transcription 138, application ID 140, resource ID 142, or combinations of each.

For an entity, important N-gram, or important concept that is extracted from content of a URL, annotation engine 120 determines how important the extracted content is to the overall content. Likewise, for text at a screen, annotation engine 120 can also determine how important the content extracted from text on a screen is to the overall text content of the screen. For screens that correspond to a known app, display patterns may be already known about that app. For example, the display patterns can indicate or identify which parts of a screen contain boilerplate or less relevant content, as well as which parts of a screen represent important components for the app, such as a title bar in a web browser or a username in a chat app. An importance value for an annotation can also depend on a strength of a relationship for annotations derived indirectly relative to other annotations. In general, annotations and their importance can be periodically updated by adding annotations, modifying annotations, or deleting annotations.

Annotation engine 120 generates a set of annotations for retrieving a bookmark (210). Each annotation in the set of annotations is generated from the multiple obtained annotations. System 100 assess the importance value for each annotation and determines whether each annotation has an importance value (e.g., 0.82) that exceeds a threshold importance value (e.g., 0.65). In some implementations, each annotation in the generated set of annotations for retrieving the bookmark has an importance value that exceeds some predefined threshold value. Each annotation in the set of annotations can be stored at annotation index 126 and is associated with the bookmark. In some implementations, system 100 uses a particular annotation in the set of annotations to retrieve the bookmark for accessing a resource page (212). Using the particular annotation to retrieve the bookmark is described in more detail below with reference to FIG. 4.

Figure 3A:
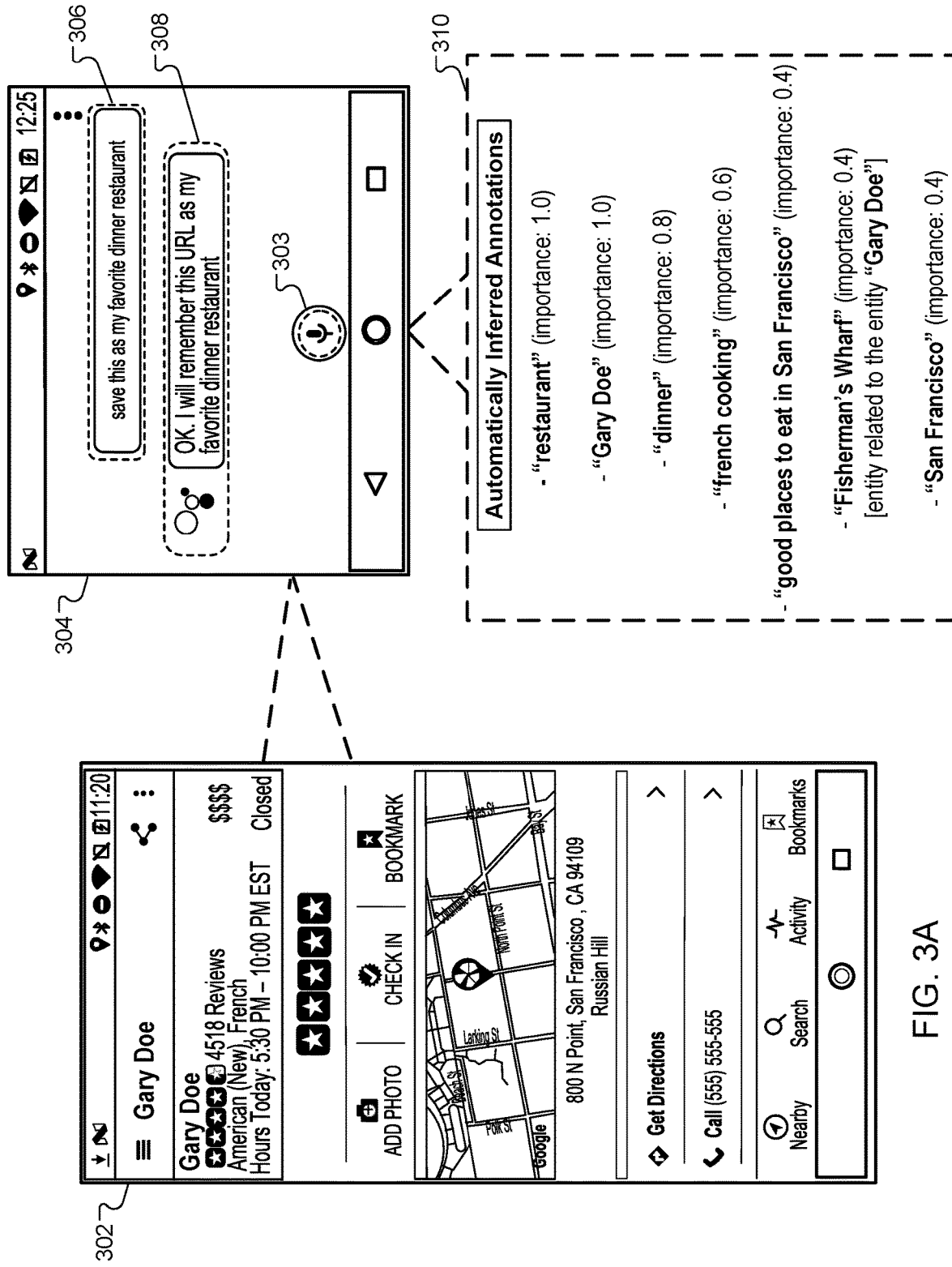
FIGS. 3A and 3B show example graphical interfaces associated with creating and annotating bookmarks based on input from a user.
Figure 3B:
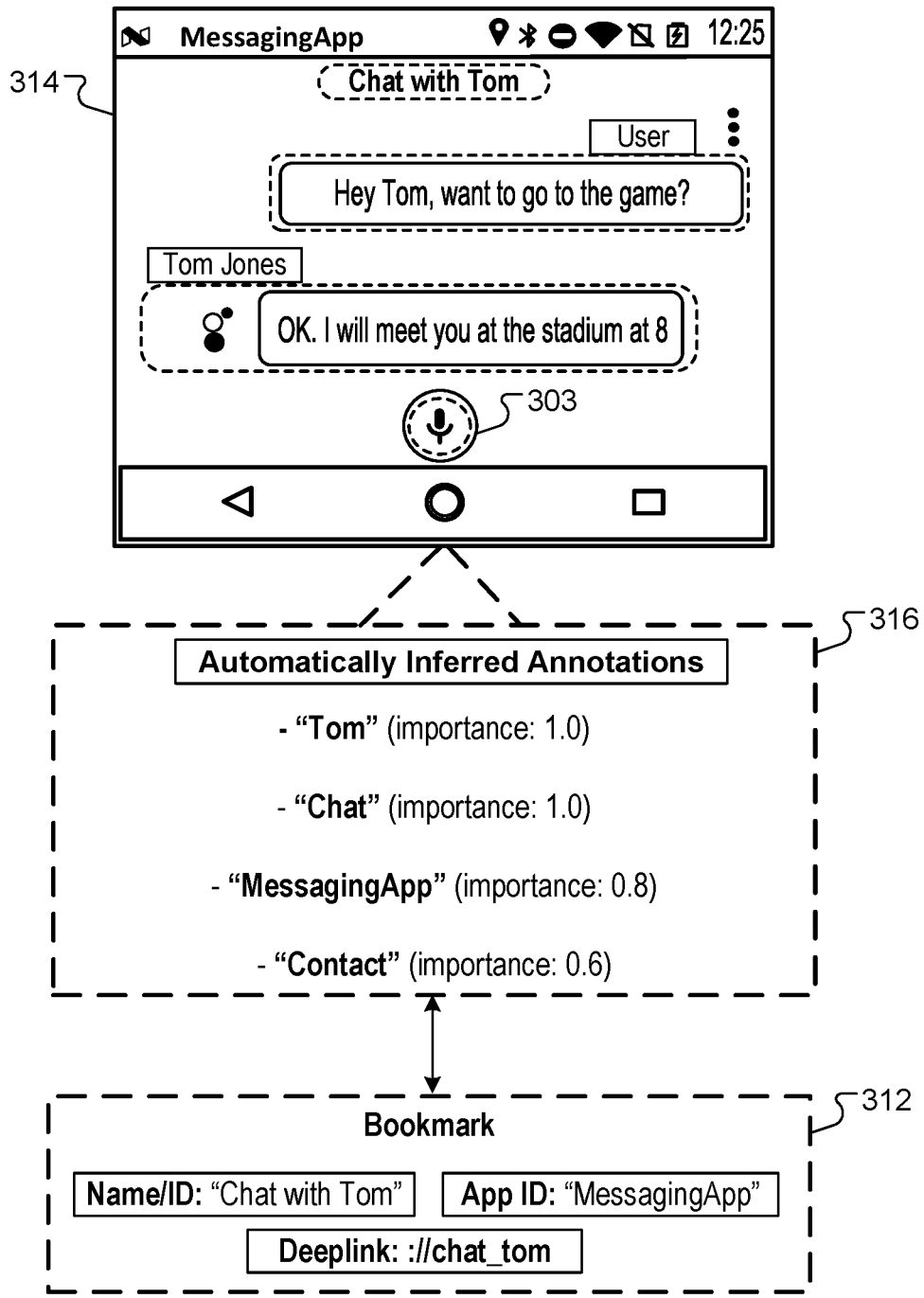

FIG. 3A and FIG. 3B show example graphical interface 302 and 304, respectively. These interfaces are associated with computing elements for annotating bookmarks based on voice input 103 from a user. Interface 302 shows an example resource page accessed at client device 102. Interface 302 can correspond to an example website accessed via a web URL ("www.example.com") or a review page of an app that rates restaurants at a geographic location. Interface 304 can be an example graphical interface that is associated with device assistant 116. Interface 304 shows user input 306 and assistant output 308. Input 306 is a transcription of voice input 103 received by client device 102.

A user may be viewing a review page for Gary Doe's restaurant in an app and issues voice input 103 to client device 102 by speaking an example command, such as "save this as my favorite dinner restaurant." A display of client device 102 can show a microphone icon 303 that illuminates (e.g., when tapped by a user) to indicate that a listening mode of client device 102 has been activated. System 100 processes the command for "save this as my favorite dinner restaurant" to generate a bookmark that includes at least a deep-link or URL for accessing a review page for Gary Doe's restaurant in a native application. In response to processing the command, system 100 generates and stores a bookmark that may be identified as "my favorite dinner restaurant."

Annotations 310 represent an example set of annotations that can be automatically inferred from analysis of information obtained from the different sources of data that form context data 134. Annotations 310 can be automatically generated when a bookmark is created or at any time after the bookmark is created. For example, a user creates a bookmark named "my favorite dinner restaurant" associated to an example web URL www.example.com/restaurant. Creation of the bookmark can cause system 100 to automatically infer a set of annotations using one or more of the computing processes described above.

A first annotation can be "restaurant" with a computed importance value of 1.0. The annotation "restaurant" can correspond to an important N-gram in the bookmark's name and the "type" (a restaurant) of the main entity from the URL text and content ("Gary Doe"). A second annotation can be "Gary Doe" with a computed importance value of 1.0. The annotation "Gary Doe" can correspond to an entity such as the main entity in the URL text and content/term ("Gary Doe") from the URL text or a webpage linked to the URL. A third annotation can be "dinner" with a computed importance value of 0.8. The annotation "dinner" can correspond to an important N-gram in the bookmark's name.

Another annotation can be "french cooking" with a computed importance value of 0.6. The annotation "french cooking" can correspond to a term or set of terms mentioned in the URL content, a webpage linked to the URL, or a salient concept associated to the URL by a search engine. Another annotation can be "good places to eat in San Francisco" with a computed importance value of 0.4. The annotation "good places to eat in San Francisco" can correspond to query for which the URL shows up in the top K results of a search engine. Another annotation can be "Fisherman's Wharf" with a computed importance value of 0.4. The annotation "Fisherman's Wharf" can correspond to an entity related to the entity "Gary Doe" or to an entity that also appears in the URL content, but that is not particularly relevant to the content. In other implementations, a user may also add a manual annotation "great lobster." This annotation can be processed in order to extract "lobster" as another annotation.

In other implementations, a bookmark 312 is created with the bookmark name or identifier "chat with Tom." The bookmark may be created while the user is viewing or interacting with an example MessagingApp at client device 102 and exchanging message communications 314 with their contact "Tom Jones." Creation of the bookmark "chat with Tom" can cause system 100 to automatically infer a set of annotations 316 using one or more of the computing processes described above. A first annotation can be "Tom" with a computed importance value of 1.0. The annotation "Tom" can correspond to an important N-gram in the bookmark's name, an alias for at least two user contacts ("Tom Jones" and "Tom Myers"), or an N-gram that also appeared on the screen when the bookmark was created, e.g., close to the top of the screen where a username is shown.

A second annotation can be "chat" with a computed importance value of 1.0. The annotation "chat" can correspond to an important N-gram in the bookmark's name or a "type" of the app to which the bookmark points. For example, the type of the app can be "chat app" or "message app." A third annotation can be "MessagingApp" with a computed importance value of 0.8. The annotation "MessagingApp" can correspond to the name of the app to which the bookmark points. Another annotation can be "Tom Jones" with a computed importance value of 0.9. The annotation "Tom Jones" can correspond to a name appearing on the screen when the bookmark was created or a name of a contact of the user that is stored in a native contacts app of client device 102. Another annotation can be "contact" with a computed importance value of 0.6. The annotation "contact" can correspond to a "type" of the personal entity "Tom Jones."

Figure 4:
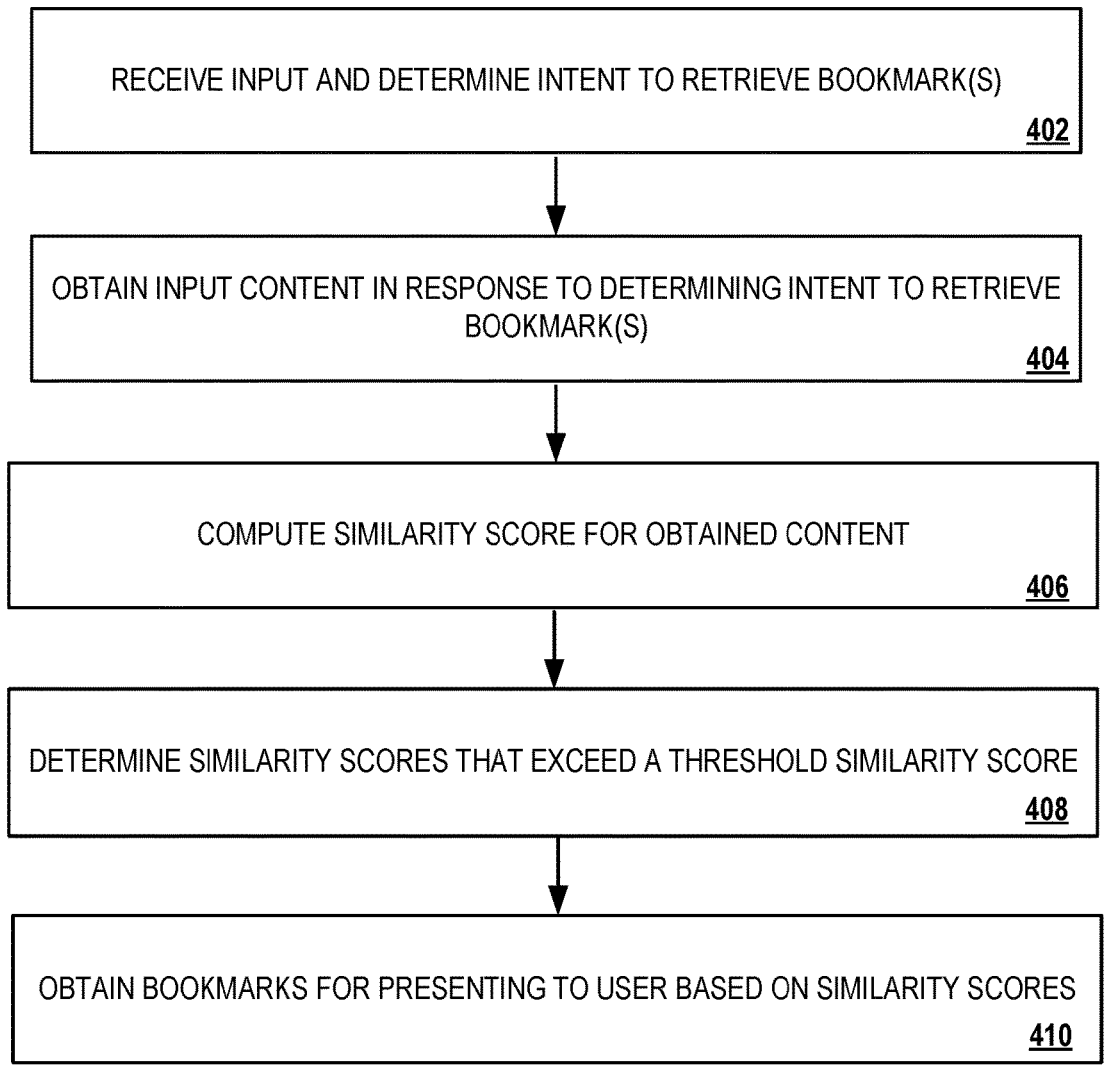
FIG. 4 is a flow diagram of an example process for retrieving annotated bookmarks.

FIG. 4 is a flow diagram of a process 400 for retrieving annotated bookmarks. Process 400 can be implemented or executed using system 100 described above. Descriptions of process 400 may reference the above-mentioned computing resources of system 100. In some implementations, described actions of process 400 are enabled by programmed instructions that are executable by at least one processor and memory of the computing systems described in this document.

Referring now to process 400, system 100 receives a second input, e.g., voice input 105, from a user and processes the input to determine whether the input indicates a user intent to retrieve or obtain a bookmark (402). For example, after providing voice input 103, a user may later issue a command or query, e.g., text/voice input 105, in order to retrieve all the bookmarks matching the criteria mentioned in the command/query. A command can be "show me my restaurant bookmarks," while a query can be "what are my San Francisco bookmarks?" Hence, the second input can be a voice input command or query to retrieve an existing bookmark. In some implementations, data for retrieved bookmarks is displayed or shown to the user via graphical representations provided for output at a display of client device 102. In addition to showing or displaying the bookmarks, device assistant 116 can also audibly respond to a user to provide a listing of the user's bookmarks. For example, the command can be "read me back my bookmarks" and client device 102 can use audio data for stored bookmarks or annotations to audibly respond with a list of the user's bookmarks.

System 100 obtains input content in response to determining that the voice input indicates user intent to retrieve a bookmark (404). For example, annotation engine 120 uses annotation retrieval logic 130 to analyze a transcription of voice input 105 to determine whether the input indicates user intent to retrieve a bookmark based on the analysis. The analysis can be performed using grammars or classifiers that process terms of a transcription based on inferences determined using a machine-learning engine. The machine-learning engine can use specific computing rules to process and analyze terms, term sequences, and/or extracted N-grams to infer user intent to retrieve a stored bookmark.

In response to determining that voice input 105 indicates user intent to retrieve a bookmark, annotation engine 120 obtains the input content including one or more terms from the transcription of voice input 105. If a query indicates user intent to retrieve a bookmark, then important N-grams, concepts, and entities from the query are extracted using one or more of logic 124 or 130. For example, if the transcription of voice input 105 is "show me my restaurant bookmarks," or "list my bank of xyz bookmarks," then annotation engine 120 may extract the term "restaurant" from the transcription or may extract the entity term "bank of xyz" from the transcription.

In some implementations, entities related to the extracted entities are retrieved as well as the types for each entity. Important N-grams and concepts related to the extracted entities are then also retrieved. In some cases, each extracted content, such as an N-gram or an identifier for an entity, is represented by a data or content signal. System 100 is configured to analyze the extracted items and assign an importance value to the items. Hence, each extracted item, or the respective signal(s) representing the item, may have an importance associated to them, which is indicated by a computed importance value (e.g., 0.53).

The importance value is computed in a manner that is similar, or substantially similar, to the method of computing the importance value for the annotations (described above with reference to FIG. 2). The importance can depend on a type of the signal and on a relevance of the signal with reference to the user query indicated by voice input 105. As indicated above, annotation engine 120 determines a type of each signal by referencing a type indicator assigned to the signal. The type indicator is determined in a manner that is similar, or substantially similar, to the method of determining the type indicators for the annotations (also described above with reference to FIG. 2).

System 100 computes a similarity score for each of the obtained or extracted content items against annotations linked to one or more bookmarks stored at an example bookmark index (406). For example, data describing each content item or obtained terms of the transcription of voice input 105 are compared to each of the one or more bookmarks included in the bookmark index based on an annotation match scoring process (described below). Each content item or term is compared, matched, or otherwise analyzed against each bookmark that is stored for the user. Analyzing a content item against each bookmark stored for a user includes analyzing various data about the item against each bookmark. Data about the item can include all signals associated with the item as well as the respective importance value for each signal.

For each bookmark, or content item, annotation engine 120 uses retrieval logic 130 to compute a similarity (or matching) score, e.g., 0.95, for the bookmark or the item. The similarity score is computed based on the comparison or analysis of the extracted item against information for the bookmark, including annotations assigned to the bookmark. The computed similarity score indicates a similarity between an extracted item and a bookmark. For example, the computed similarity score characterizes the extent to which an extracted term ("restaurant") or set of extracted terms ("bank of xyz") matches data that defines the bookmark. The extracted terms are matched against an annotation for the bookmark. In some implementations, the extracted terms are also matched against other data for a bookmark, such as a name of a bookmark, an identifier for a bookmark, text for a URL, or text for a deep-link that each combine to define a bookmark.

A similarity or matching score of a bookmark, B, (matching_score(B)) can be computed as follows. For each query signal, S, and each matching annotation, A, of the bookmark, a signal-annotation matching score (signal_annotation_matching_score(S, A)) is computed using specific computational rules of annotation retrieval logic 130. For example, the signal-annotation matching score is computed based on: i) the importance of the signal S; ii) the importance of the annotation A; and iii) the semantic similarity between S and A.

In some implementations, a query signal S matches a bookmark annotation A if the two are identical (e.g., highest similarity score), or if the two are semantically similar. For example, a query signal S that represents the extracted term "dinner" and a bookmark annotation A that includes the term "hungry" may be semantically similar, but the terms are not semantically identical. Alternatively, "dinner" and "supper" may be determined as being semantically identical. System 100 aggregates the computed matching scores. For example, annotation engine 120 determines a matching_score(B) that is an aggregate score over all the signal-annotation matching scores signal_annotation_matching_score(S, A).

To determine the aggregate score, annotation engine 120 first computes an annotation matching score for each annotation A (annotation_matching_score(A)) by aggregating the signal_annotation_matching_score(S, A) over all the query signals S and then aggregating the annotation matching scores over all the annotations A into matching_score(B). Other methods for computing bookmark annotation matching scores can also be employed. Such methods can be based on computations performed using the machine learning engine. For example, the machine-learning engine can use computing logic relating to random forest computations or deep neural networks trained to determine semantic similarities. Methods involving similarity metrics may also be used, such as variations of cosine similarity between a set of annotations and a set of query signals, where weighting of parameters in the computations depend on importance values of the annotations or query signals.

System 100 determines whether each computed similarity score for each content item or bookmark exceeds a threshold similarity score (408). System 100 obtains one or more bookmarks for presenting to a user based on similarity scores that exceed a threshold similarity score (410). For example, annotations for a bookmark that have a corresponding similarity score exceeding a threshold score are used to present a bookmark to the user as bookmarks/annotation data 143. The presented bookmarks are linked to annotations with similarity scores that exceed the threshold score.

Bookmarks or annotation data 143 can include description 144, deep-link 146, web URL 148, screenshot data 150, and app identifier 140. Client device 102 uses a resource identifier of annotation data 143 to access a particular resource page and present the resource page to a user via a display of client device 102. Screenshot 150 is a digital image of a resource page that can be presented to the user when client device 102 accesses a stored bookmark. In some implementations, annotation engine 120 stores annotations in index 126 (server-side) and transmits annotation data 143 to client device 102 for local storage on the device using index 114. Annotation data might also include an audio file, such as for audibly responding to aspects of a query in an example audio environment. In some instances, an audio file of the annotation data is accessed to audibly respond to aspects of a query in an all-audio environment. In addition, client device 102 can include Text-to-Speech (TTS) functionality. For example, client device 102 can include a TTS component that is configured to convert response text to audio output at client device 102. The TTS component can access annotation data representing text for extracted terms and N-grams in order to generate an audio file that is used to audibly respond to query for an audio environment.

As discussed above, a particular annotation in a set of annotations can be used to retrieve a bookmark for accessing a resource page. Using the particular annotation to retrieve the bookmark includes system 100 receiving voice input 105, annotation engine 120 selecting the particular annotation from the set of annotations to cause retrieval of the bookmark, and using the particular annotation to retrieve the bookmark for accessing the resource page. The particular annotation is selected based on a similarity score for the annotation exceeding a threshold similarity score. In some implementations, the annotation is configured as a trigger to cause retrieval of the bookmark. For example, a method of system 100 for using the annotation to retrieve a bookmark linked to the annotation includes: i) determining that a trigger condition is satisfied based on analysis of a transcription of voice input 105; ii) retrieving the bookmark from a bookmark index in response to determining that the trigger condition is satisfied; and iii) providing the bookmark for display at client device 102 in response to retrieving the bookmark from the bookmark index.

The following description illustrates an example operation of system 100 that involves retrieving a stored bookmarks based on one or more generated annotations. Client device 102 can receive an input 105 for a user command "call my favorite bakery." System 100 identifies the bakery using annotations for a bookmark that includes contact information for the user's favorite bakery. In some implementations, device assistant 116 obtains information about the bakery, such an address for the bakery, a phone number for the bakery, or an active link for accessing the bakery's website. Device assistant 116 performs a search for information about the bakery and generates a ranked listing of results obtained during the search. Using the match scoring process described above, system 100 obtains one or more bookmarks by matching annotations and other data items of stored bookmarks against extracted terms of the input command "call my favorite bakery."

System 100 can bias a search result using an obtained bookmark. The bookmark is obtained based on the processes described herein for retrieving annotations and bookmarks linked to annotations. An obtained bookmark may have the name/identifier "my favorite bakery" and may include a phone number that is stored for the user's favorite bakery. Device assistant 116 identifies the phone number as a result of the search and uses the phone number to call the user's favorite bakery. Alternatively, client device 102 can receive an input for a user command "call my bookmarked burger restaurant in San Francisco." For this command, a similar process for obtaining bookmarked information for the burger restaurant is used to extract a phone number for calling the restaurant.

In some implementations, a particular bookmark in a listing of bookmarks is invoked using one or more biasing terms. For example, client device 102 receives a user command "what are my bookmarks" and system 100 responds by generating a list of respective URIs or URLs for each bookmark, but not the content to which the URIs point. To access the content to which the URIs point, a biasing term is used to invoke the bookmark. For example, the bookmark is invoked either by using an identifier for the bookmark as a biasing term/factor (e.g., "call my bookmarked burger restaurant") or by using a position indicator to select a particular bookmark in the listing (e.g., "call the second one"). In general, the described computing processes for determining a match score for a matching query or command signal to bookmark annotations can be used to invoke a bookmark, or deep-link, to retrieve content. In some instances, the content (e.g., a phone number) may be retrieved from a third-party website that includes information about the entity of the bookmark. The retrieved content may also be personal data stored locally on client device 102. For example, the personal data can be audio data for playing a song/music file stored on the device or user data for returning to a state of play in a gaming application.

Annotation of stored bookmarks according to the described techniques is more than mere ranking of data relating to a bookmark and more than a personal user preference. But rather, annotation of stored bookmarks impacts the physical design and operation of a system. For example, the impacts are evidenced by specific design and operation requirements that enable any user to extract or obtain information from a variety of data sources. These requirements also enable any user to create and use new file structures for organizing and implementing access to information obtained from the different sources of data. In some implementations, the new file structures are dynamically sized using computing logic of annotation engine 120. This dynamic sizing enables optimization of available memory for storing and retrieving annotations and other information obtained from the data sources. For example, respective importance values for each annotation in a set of candidate annotations can be used to dynamically allocate memory resources in order to store only the most important annotations, e.g., annotations exceeding a threshold importance value.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of client devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document. Computing devices 500, 550 can be example devices whose physical design and system operation requirements are advantageously impacted by implementation of the techniques described above.

Computing device 500 includes a processor 502, memory 504, a storage device 506, a high-speed interface/controller 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations, e.g., as a server bank, a group of blade servers, or a multi-processor system.

The memory 504 stores information within the computing device 500. In one implementation, the memory 504 is a computer-readable medium. In one implementation, the memory 504 is a volatile memory unit or units. In another implementation, the memory 504 is a non-volatile memory unit or units. The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid-state memory device, or an array of devices, including devices in a storage area network or other configurations.

In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502. In some implementations, the instructions are included in program code executed using annotation engine 120. For example, processor 502 executes the instructions to cause one or more functions of search engine interface 128 and annotation retrieval logic 130 to be performed in order to obtain and analyze context data 134 for generating, dynamically storing, and retrieving annotations linked to existing bookmarks.

The high-speed controller 508 manages bandwidth-intensive operations for the computing device 500, while the low speed controller 512 manages lower bandwidth-intensive operations. Such allocation of duties is exemplary only. In some implementations, high-speed controller 512 can be a special-purpose hardware circuit with design features that improve performance of data analysis and annotation functions of system 100. For example, high-speed controller 508 can be implemented at annotation engine 120 to uniquely manage dataflow and data analysis of context data 134. Specific design features of controller 508 can enable system 100 to quickly and efficiently obtain data for creating a bookmark, generate an annotation for the bookmark, and dynamically allocate resources of memory 504 to efficiently store data associated with the annotation as well as the bookmark.

In some implementations, computing device 500 (and device 550) includes one or more additional special-purpose computing elements configured to implement various processes of system 100. For example, at least one of these elements can be used to implement computing processes of search engine interface 128, so that an existing bookmark can be used to efficiently retrieve a search result without need for a full web search. This additional element can execute specific computing rules for performing a local search based on analysis of context data 134, rather than searching external resources which may require increased bandwidth and power consumption. Hence, these additional special-purpose computing elements can function to reduce overall bandwidth, processing, memory and power/battery demands of system 100.

In one implementation, the high-speed controller 508 is coupled to memory 504, display 516, e.g., through a graphics processor or accelerator, and to high-speed expansion ports 510, which may accept various expansion cards (not shown). In the implementation, low-speed controller 512 is coupled to storage device 506 and low-speed expansion port 514. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a client device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate. As indicated above, computing device 550 can also include special-purpose hardware circuits as well as additional special-purpose computing elements for implementing various processes of system 100 that are described above at least with reference to device 550.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication, e.g., via a docking procedure, or for wireless communication, e.g., via Bluetooth or other such technologies.

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound, e.g., voice messages, music files, etc., and may also include sound generated by applications operating on device 550. The computing device 550 may be implemented in a number of different forms, as shown in the figure. For example, it may be implemented as a cellular telephone 580. It may also be implemented as part of a smartphone 582, personal digital assistant, or other similar client device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

As used in this specification, the term "module" is intended to include, but is not limited to, one or more computers configured to execute one or more software programs that include program code that causes a processing unit(s)/device(s) of the computer to execute one or more functions. The term "computer" is intended to include any data processing or computing devices/systems, such as a desktop computer, a laptop computer, a mainframe computer, a personal digital assistant, a server, a handheld device, a smartphone, a tablet computer, an electronic reader, or any other electronic device able to process data.

A number of embodiments have been described. Nevertheless, it will be understood that various modifications may be made without departing from the spirit and scope of the invention. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method, comprising:
   receiving, by a computing system, a first input associated with a bookmark;
   in response to receiving the input, obtaining, by the computing system, context data for deriving annotations for the bookmark;
      wherein the context data for deriving the annotations is obtained from a plurality of data sources;
      wherein at least one data source of the plurality of data sources includes information obtained from a search engine based on search queries submitted to the search engine that returned one or more search results that included a resource identifier stored in the bookmark;
   obtaining, by an annotation engine of the computing system, multiple annotations that are derived using information included in the context data and a transcription of the first input associated with the bookmark;
   generating, by the annotation engine, an importance value for each annotation, the importance value characterizing a relationship between each annotation and at least one of:
      i) the information included in the context data; or
      ii) the transcription of the first input;
   generating, by the annotation engine, a set of annotations for retrieving the bookmark, each annotation in the set of annotations being generated from the obtained multiple annotations and each annotation having an importance value that exceeds a threshold value; and
   using, by the computing system, a particular annotation in the set of annotations to retrieve the bookmark for accessing a resource page.

2. The method of claim 1, wherein using the particular annotation comprises:
   receiving, by the computing system, a second input; and
   selecting, by the annotation engine and based on the second input, the particular annotation from the set of annotations to cause retrieval of the bookmark; and
   using, by the computing system, the particular annotation to retrieve the bookmark for accessing the resource page.

3. The method of claim 2, wherein selecting comprises:
   analyzing a transcription of the second input;
   obtaining one or more terms from the transcription of the second input;
   for each annotation in the set of annotations:
      determining a similarity score that indicates an extent to which terms in the transcription of the second input matches terms in the annotation for retrieving the bookmark; and
   selecting the particular annotation based on the similarity score for the annotation exceeding a threshold similarity score.

4. The method of claim 1, wherein the particular annotation is configured as a trigger to cause retrieval of the bookmark and the method further comprises:
   determining, by the computing system, that a trigger condition is satisfied based on analysis of a transcription of a second input;
   retrieving, by the computing system, the bookmark from a bookmark index in response to determining that the trigger condition is satisfied; and
   providing, by the computing system, the bookmark for display at a client device in response to retrieving the bookmark from the bookmark index.

5. The method of claim 1, wherein the context data for deriving the annotations further comprises at least one of:
   i) an identifier for the bookmark;
   ii) the resource identifier stored as the bookmark;
   iii) a resource page that is accessed using the resource identifier; or
   iv) text of the resource page.

6. The method of claim 5, wherein the context data for deriving the annotations comprises an N-gram and data describing an entity, each of the N-gram and the data describing the entity being obtained from a plurality of data sources with reference to the transcription of the first input.

7. The method of claim 5, wherein:
   i) the resource page is generated by a web-browser application, and
   ii) the resource identifier is a uniform resource locator (URL) that provides a resource address for accessing the resource page.

8. The method of claim 5, wherein:
i) the resource page is generated by an application accessed using a client device, the application being configured to store one or more deep-links in an application index, and
ii) the resource identifier is a uniform resource locator (URL) for the resource page and is obtained from the application index comprising address data about the application.

9. The method of claim 5, wherein the resource identifier is at least one of:
a) data identifying a screen image of the resource page generated by an application accessed using a client device, or
b) a deep-link that provides a resource address for accessing the resource page of the application.

10. An electronic system comprising:
one or more processing devices;
one or more non-transitory machine-readable storage devices for storing instructions that are executable by the one or more processing devices to perform operations comprising:
receiving, by a computing system, a first input associated with a bookmark;
in response to receiving the first input, obtaining, by the computing system, context data for deriving annotations for the bookmark;
wherein the context data for deriving the annotations is obtained from a plurality of data sources;
wherein at least one data source of the plurality of data sources comprises information obtained from a search engine based on search queries submitted to the search engine that returned one or more search results that included a resource identifier stored in the bookmark;
obtaining, by an annotation engine of the computing system, multiple annotations that are derived using information included in the context data and a transcription of the first input associated with the bookmark;
generating, by the annotation engine, an importance value for each annotation, the importance value characterizing a relationship between each annotation and at least:
i) the information included in the context data; or
ii) the transcription of the first input;
generating, by the annotation engine, a set of annotations for retrieving the bookmark, each annotation in the set of annotations being generated from the obtained multiple annotations and each annotation having an importance value that exceeds a threshold value; and
using, by the computing system, a particular annotation in the set of annotations to retrieve the bookmark for accessing a resource page.

11. The electronic system of claim 10, wherein using the particular annotation comprises:
receiving, by the computing system, a second input; and
selecting, by the annotation engine and based on the second input, the particular annotation from the set of annotations to cause retrieval of the bookmark; and
using, by the computing system, the particular annotation to retrieve the bookmark for accessing the resource page.

12. The electronic system of claim 11, wherein selecting comprises:
analyzing a transcription of the second input;
obtaining one or more terms from the transcription of the second input;
for each annotation in the set of annotations:
determining a similarity score that indicates an extent to which terms in the transcription of the second input matches terms in the annotation for retrieving the bookmark; and
selecting the particular annotation based on the similarity score for the annotation exceeding a threshold similarity score.

13. The electronic system of claim 10, wherein the particular annotation is configured as a trigger to cause retrieval of the bookmark and the method further comprises:
determining, by the computing system, that a trigger condition is satisfied based on analysis of a transcription of a second input;
retrieving, by the computing system, the bookmark from a bookmark index in response to determining that the trigger condition is satisfied; and
providing, by the computing system, the bookmark for display at a client device in response to retrieving the bookmark from the bookmark index.

14. The electronic system of claim 10, wherein the plurality of data sources further comprise at least one of:
i) an identifier for the bookmark;
ii) the resource identifier stored as the bookmark;
iii) a resource page that is accessed using the resource identifier; or
iv) text of the resource page.

15. The electronic system of claim 14, wherein the context data for deriving the annotations comprises an N-gram and data describing an entity, each of the N-gram and the data describing the entity being obtained from a plurality of data sources with reference to the transcription of the first input.

16. The electronic system of claim 14, wherein:
i) the resource page is generated by a web-browser application, and
ii) the resource identifier is a uniform resource locator (URL) that provides a resource address for accessing the resource page.

17. The electronic system of claim 14, wherein:
i) the resource page is generated by an application accessed using a client device, the application being configured to store one or more deep-links in an application index, and
ii) the resource identifier is a uniform resource locator (URL) for the resource page and is obtained from the application index comprising address data about the application.

18. The electronic system of claim 14, wherein the resource identifier is at least one of:
a) data identifying a screen image of the resource page generated by an application accessed using a client device, or
b) a deep-link that provides a resource address for accessing the resource page of the application.

19. One or more non-transitory machine-readable storage devices storing instructions that are executable by one or more processing devices to perform operations comprising:
receiving, by a computing system, a first input associated with a bookmark;
in response to receiving the first input, obtaining, by the computing system, context data for deriving annotations for the bookmark;
wherein the context data for deriving the annotations is obtained from a plurality of data sources;

wherein at least one data source of the plurality of data sources comprises information obtained from a search engine based on search queries that returned one or more search results that included a resource identifier stored in the bookmark;

obtaining, by an annotation engine of the computing system, multiple annotations that are derived using information included in the context data and a transcription of the first input associated with the bookmark;

generating, by the annotation engine, an importance value for each annotation, the importance value characterizing a relationship between each annotation and at least:
i) the information included in the context data; or
ii) the transcription of the first input;

generating, by the annotation engine, a set of annotations for retrieving the bookmark, each annotation in the set of annotations being generated from the obtained multiple annotations and each annotation having an importance value that exceeds a threshold value; and using, by the computing system, a particular annotation in the set of annotations to retrieve the bookmark for accessing a resource page.

20. The machine-readable storage devices of claim 19, wherein using the particular annotation comprises:

receiving, by the computing system, a second input; and selecting, by the annotation engine and based on the second input, the particular annotation from the set of annotations to cause retrieval of the bookmark; and using, by the computing system, the particular annotation to retrieve the bookmark for accessing the resource page.

* * * * *